United States Patent
Christy et al.

(10) Patent No.: US 9,174,861 B2
(45) Date of Patent: Nov. 3, 2015

(54) PROCESS AND APPARATUS FOR TREATING WATER WITH HYDRATED LIME SLURRY AND FOR DISSOLVING SCALE

(75) Inventors: Richard W. Christy, Eagleville, PA (US); Michael Quici, Ambler, PA (US); Louis Litz, Ambler, PA (US)

(73) Assignee: RDP Technologies, Inc., Conshohocken, PA (US)

( * ) Notice: Subject to any disclaimer, the term of this patent is extended or adjusted under 35 U.S.C. 154(b) by 541 days.

(21) Appl. No.: 13/302,312

(22) Filed: Nov. 22, 2011

(65) Prior Publication Data

US 2012/0061328 A1  Mar. 15, 2012

(51) Int. Cl.
C02F 1/68 (2006.01)
C02F 1/52 (2006.01)

(52) U.S. Cl.
CPC ........................... *C02F 1/529* (2013.01)

(58) Field of Classification Search
CPC ................................. C02F 1/529; C04B 2/08
See application file for complete search history.

(56) References Cited

U.S. PATENT DOCUMENTS

| | | | |
|---|---|---|---|
| 2,904,401 A | 9/1959 | Booth | |
| 4,064,744 A | 12/1977 | Kistler | |
| 4,166,997 A | 9/1979 | Kistler | |
| 4,261,953 A | 4/1981 | Gisler | |
| 4,454,770 A | 6/1984 | Kistler | |
| 4,482,528 A | 11/1984 | Emmett | |
| 4,588,559 A | 5/1986 | Emmett | |
| 5,013,458 A | 5/1991 | Christy, Sr. et al. | |
| 5,229,011 A | 7/1993 | Christy, Sr. et al. | |
| 5,313,022 A | 5/1994 | Piroozmandi et al. | |
| 5,336,481 A | 8/1994 | Muzik et al. | |
| 5,346,616 A | 9/1994 | Christy, Sr. et al. | |
| 5,368,731 A | 11/1994 | Pesotini | |
| 5,401,402 A | 3/1995 | Christy et al. | |
| 5,405,536 A | 4/1995 | Christy | |
| 5,433,844 A | 7/1995 | Christy | |
| 5,554,279 A | 9/1996 | Christy | |
| 5,618,442 A | 4/1997 | Christy | |
| 5,746,983 A | 5/1998 | Stephansen | |
| 5,770,823 A | 6/1998 | Piroozmandi | |
| 5,895,763 A * | 4/1999 | Edstrand et al. | 436/55 |
| 6,296,761 B1 * | 10/2001 | Scheuerman, III | 210/189 |
| 6,568,842 B1 | 5/2003 | Murray | |
| 7,416,673 B2 | 8/2008 | Christy et al. | |
| 7,669,348 B2 | 3/2010 | Christy et al. | |
| 8,065,815 B2 | 11/2011 | Christy et al. | |
| 2006/0231507 A1 | 10/2006 | Christy et al. | |
| 2006/0231511 A1 | 10/2006 | Christy et al. | |
| 2008/0185324 A1 | 8/2008 | Christy et al. | |
| 2010/0196258 A1* | 8/2010 | Stephansen | 423/636 |
| 2011/0089115 A1* | 4/2011 | Lu | 210/683 |

* cited by examiner

Primary Examiner — Melvin C Mayes
Assistant Examiner — Douglas Call
(74) Attorney, Agent, or Firm — Paul & Paul (57) ABSTRACT

A method and apparatus is provided for treating water with already-slaked lime to arrive at a lime slurry that is in a solution or suspension, and delivering the thus treated water to a separating device which separates grit particles therefrom, to recover a high quality lime/water solution or suspension. An automated system controls the addition of lime and water to a lime mixing vessel.

An acid wash system is provided which comprises an automated method and apparatus for removing scale buildup, for delivering an acid wash solution to the lime mixing vessel, the lime slurry holding tank and/or the delivery system, or any of them, thereby dissolving the scale buildup.

9 Claims, 4 Drawing Sheets

PROCESS AND APPARATUS FOR TREATING WATER WITH HYDRATED LIME SLURRY AND FOR DISSOLVING SCALE

THE PRESENT INVENTION

The present invention is directed to a process and apparatus for treating waste water, sewage sludge and/or purifying drinking water with a hydrated lime slurry in a mixing vessel, after the lime slaking process has already taken place, and a process and apparatus for dissolving scale that forms on internal surfaces of process equipment, including a lime mixing vessel, a holding tank, and an optional grit separation device, by introducing an acid into the system.

BACKGROUND OF THE INVENTION

Lime has been used in the treatment of sewage sludge to remove pathogens, lime stabilization of waste water, pasteurization of sludge and purification of drinking water by adjusting the pH of the water. Examples of such processes involving the use of lime can be found in U.S. Pat. Nos. 5,013,458; 5,229,011; 5,346,616; 5,401,402; 5,405,536; 5,433,844; 5,554,279; 5,618,442; and 7,416,673, which contents are incorporated herein by reference.

Calcium oxide (CaO), is mixed with water ($H_2O$) to form calcium hydroxide ($Ca(OH)_2$). The chemical reaction which occurs during such mixing gives off heat in the form of an exothermic reaction. When this reaction is done in the presence of excess water it is commonly referred to as lime slaking. This process is accomplished in a device known as a lime slaker. The resulting mixture of $Ca(OH)_2$ and water is known as a lime slurry and is referred to as a hydrated lime or quicklime or $Ca(OH)_2$ and has water trapped in it. There is no further exothermic reaction after the lime slaking occurs.

Lime slurries are known to have some unique properties, one of which is an inherent ability to form scale on surfaces which come into contact with the lime slurry. The formation of scale, or "scaling" can render the various delivery systems, such as pipes, troughs, conduits, etc. unusable over time due to the build-up of scale. Such scale build-up requires frequent cleaning and descaling of the equipment that is used to handle lime slurries. Cleaning and descaling operations can be considerably labor and cost intensive.

Lime slurries also contain a certain amount of inert material that is commonly referred to as grit. Grit results because the lime contains a certain amount of material other than calcium oxide (CaO). Typically, quicklime is more than 90% pure and contains approximately up to 8% inert material or grit.

The presence of grit in a lime slurry can cause numerous problems, including grit build-up in downstream process chambers or vessels, grit acting to plug or clog nozzles or any orifices through which the slurry passes, and abrasions caused to treatment equipment and slurry delivery equipment such as pumps, pipes, valves, etc. because of the abrasive nature of grit particles.

SUMMARY OF THE INVENTION

This invention provides a method of and apparatus for treating water with already-slaked lime that is in a solution or suspension and delivering the same to a separation device which separates grit particles therefrom, thereby recovering a high-quality lime suspension. An automated system comprising the method steps of this method is also an object of this invention.

As used herein, lime slurry is defined to include either lime particles dissolved in water or a suspension of small lime particles in water, and is also referred to as lime-treated water.

In addition, an acid wash system is provided which comprises an automated method and apparatus for removing scale build-up in a lime mixing vessel, a lime slurry holding tank, and/or a delivery system comprising monitoring scale build-up in the lime mixing vessel, the lime slurry holding tank, and/or the delivery system; and at a pre-determined set point of scale build-up or time, delivering an acid wash solution to the lime mixing vessel, the lime slurry holding tank, and/or the delivery system, thereby dissolving the scale build-up.

DETAILED DESCRIPTIONS OF THE PREFERRED EMBODIMENTS

Figure 1:
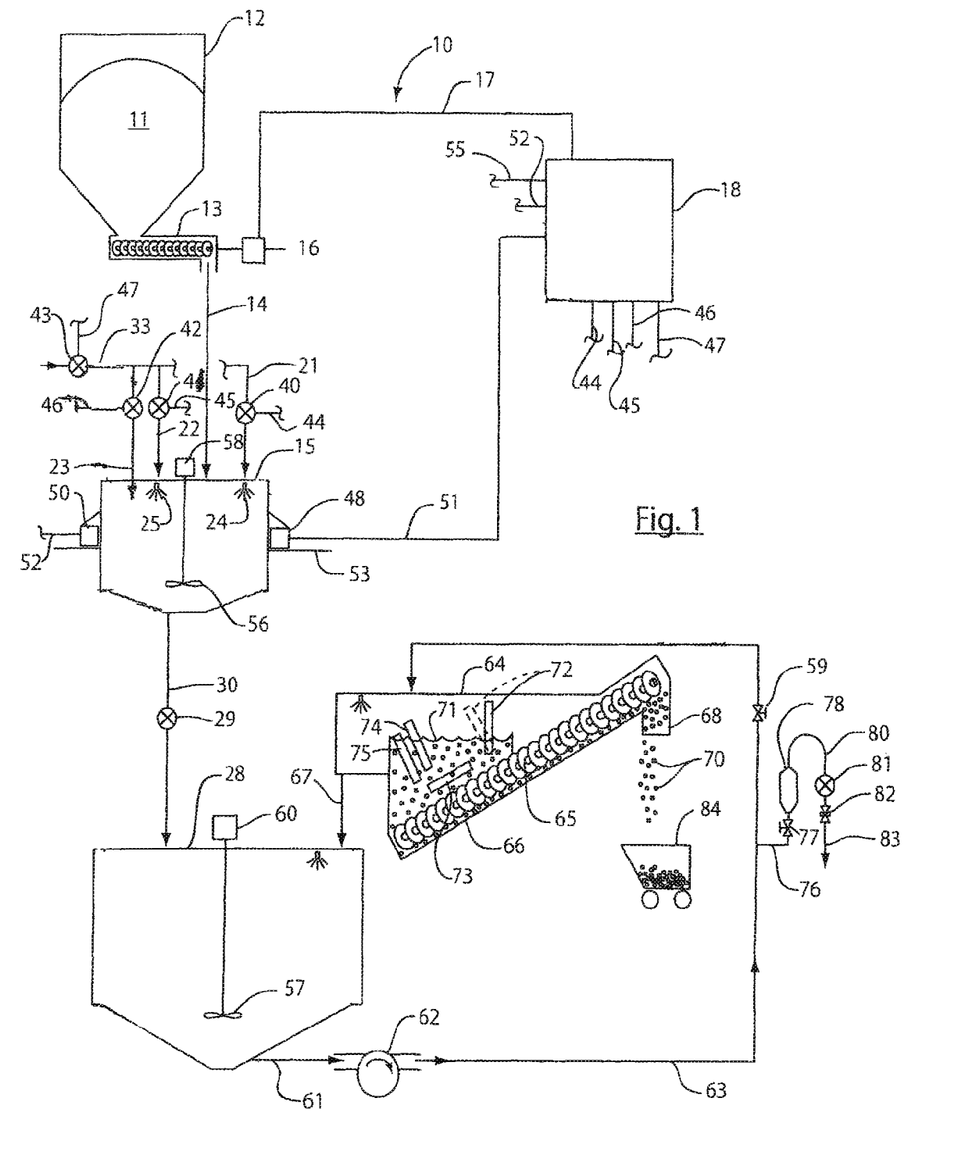
FIG. 1 is a schematic of the system and method for producing high quality lime-treated water according to the invention.

First, it will be noted that in FIG. 1, the lime mixing system and its components are principally illustrated, along with a holding tank and grit classifier, with various sensors, controls and delivery lines.

Figure 3:
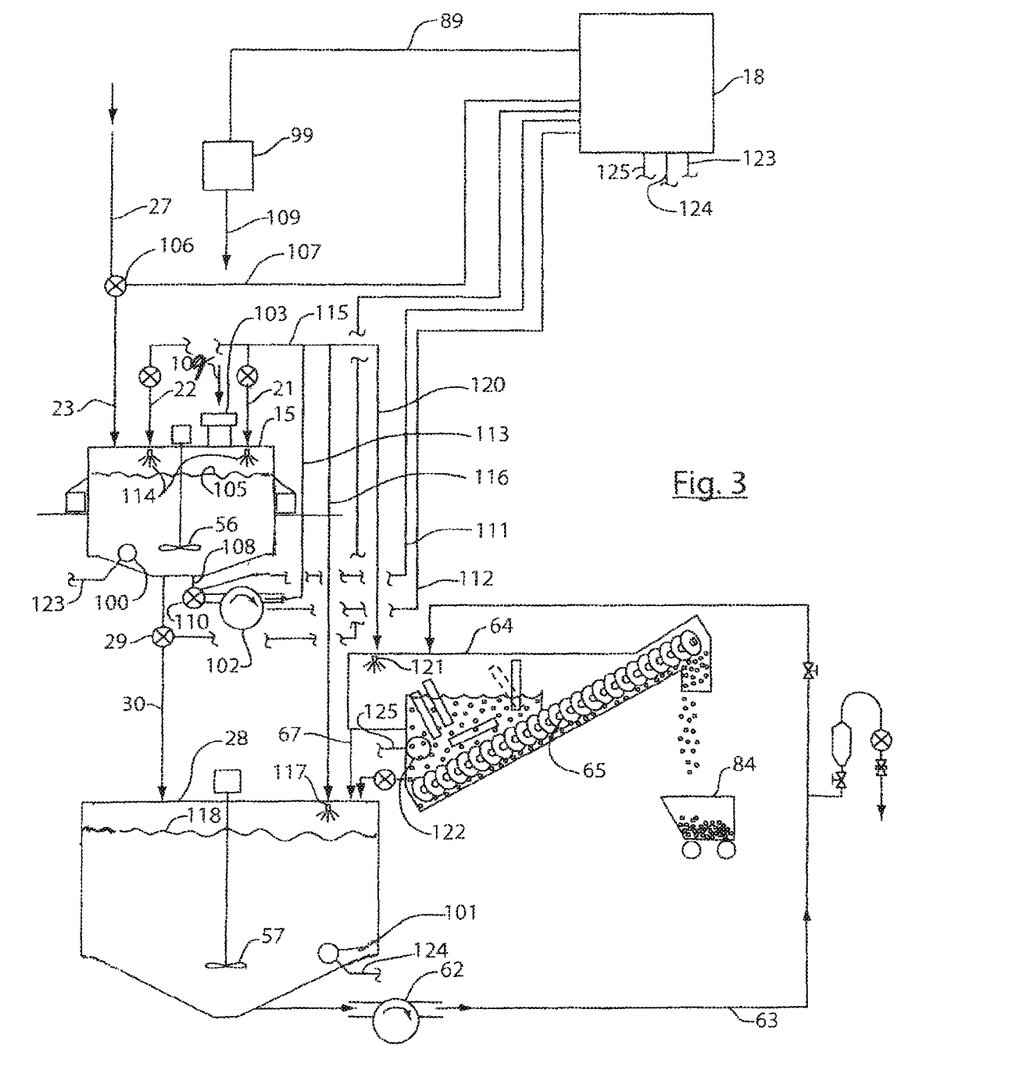
FIG. 3 is a schematic of the acid wash system in accordance of this invention, whereby scale is removed from the various components of the system.

In FIG. 3, many of the same components as are illustrated in FIG. 1 are also illustrated, but wherein FIG. 3 emphasizes the acid wash system, its sensors and controls. It will be understood that the system of this invention can be and preferably is a combination of that which is illustrated in each of FIGS. 1 and 3, but that, for simplicity of presentation and ease of understanding, FIG. 1 is principally directed to the lime mixing system and related components, whereas FIG. 3 is principally directed to the acid wash system and related components.

Figure 2:
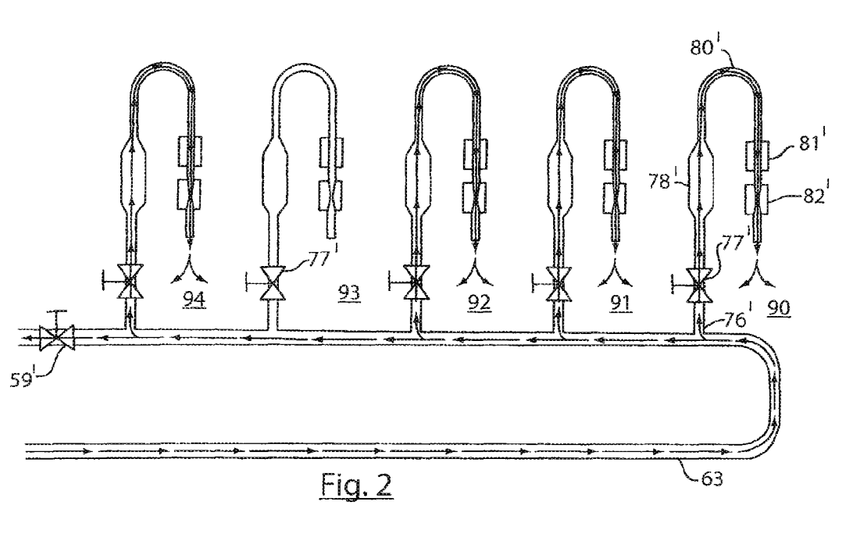
FIG. 2 is a schematic fragmentary view of a multi-point precision dosing arrangement, wherein the slurry from a slurry loop pump delivers lime-treated water to a plurality of dosing locations, which can be at different dosing rates as the slurry is pumped to a grit classifier.

In FIG. 1 there is illustrated a system that comprises apparatus and method to automatically and continuously deliver precise doses of high quality lime/water solution or suspension and in FIG. 2, the doses are shown to be delivered at a plurality of locations. In the system as illustrated in FIGS. 1 and 2, the operating system is capable of functioning with little or no operator attention, input, or routine maintenance.

In FIG. 1, the system is generally designated by the numeral 10. Lime 11 is present in a lime storage silo 12 and is delivered via a delivery auger, conveyor or other delivery device 13 via a suitable delivery line 14, to a lime mixing vessel 15. The operation of the delivery device 13 may be controlled by a suitable preferably electric motor 16 that in turn, is automatically activated via a control line 17 from a programmable logic computer 18.

The lime 11 in the lime storage silo 12 includes grit particles. The water that is introduced into the mixing vessel may be at any temperature that is available to the facility in which the mixing takes place. The lime is essentially hydrated lime, so no chemical reaction occurs.

Lines 21 and 22 deliver water into the lime mixing vessel 15 via spray nozzles 24, 25 respectively. Line 23 may deliver water into the lime mixing vessel 15 either through spray nozzle(s) or via any delivery means, as may be desired.

The water is provided, preferably via line 33. The slurry holding tank 28 receives lime slurry from the lime mixing vessel 15, via delivery line 30.

The water delivered via line 33 to the mixing vessel 15 is via any of lines 21, 22 and 23.

It will be understood that the lime delivery conveyor 13 can be a volumetric feeder device, the control of which is via motor 16 as dictated by the computer 18.

The water that is delivered to the lime mixing vessel 15 via lines 21, 22 and/or 23 can be controlled by suitable valves 40, 41, 42 and 43 that are also controlled from the computer 18, via respective control lines 44, 45, 46 and 47.

The lime mixing vessel 15 may sit on a plurality of load cells 48, 50, that in turn support the lime mixing vessel 15 on a floor 53, with the load cells 48, 50 being connected to the computer 18 via signal lines 51 and 52, so that the computer 18 can automatically control the inflow of water and lime into the lime mixing vessel 15, by controlling the lime feeder motor 16 and the various water supply valves 40-43.

The load cells may be constructed as are the load cells in U.S. Pat. No. 7,669,348, or any one or more of U.S. Pat. Nos. 5,770,823; 4,064,744; 4,166,997; 4,454,770 and 5,313,022, the complete disclosures of which are herein incorporated by reference.

It will also be understood that the lime mixing vessel 15 and the holding tank 28 are provided with suitable respective mixers 56, 57, motor driven at 58, 60 respectively.

The system 10 also includes a discharge line 61 from the slurry holding tank 28, which discharges to the inlet or suction side of a pump 62, which in turn, delivers the slurry via line 63, to a separation device 64, that is of the gravity operative grit classifier type. The separation device 64 comprises a tank with a sloped auger 65 which conveys grit up a slope 66, which grit has become separated from the liquid 71 in the tank 64, in that the lower end of the auger 65 is immersed in the liquid therein, and operates to engage the grit particles and convey them up the sloped surface to be discharged at 68. The separation device 64 can be either external to or integral with the lime slurry holding tank 28. The auger conveys the grit 70 out the discharge 68 thereof, into a dumpster 84 or other removable discharge unit.

Prior to delivering slurry via line 63 to the separation device 64, a portion of the lime-treated water can be extracted at line 76, through a valve 77, through a grit trap 78, then via line 80, through a magnetic flowmeter 81 and pinch valve 82, to a dosing location thereneath, at 83.

Figure 1A:
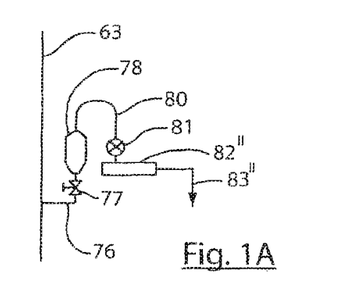
FIG. 1A is a schematic illustration of a portion of FIG. 1, which represents an alternative to the delivery of lime slurry to a dosing location, relative to that illustrated in FIG. 1, in which a metering pump is used lieu of a pinch valve.

FIG. 1A illustrates in schematic form, in which lime-treated water is extracted from line 63, via line 76, through a valve 77, through a grit trap 78, and then via line 80 through a magnetic flowmeter 81 and a metering pump 82" that is used in lieu of the pinch valve 82 of FIG. 1, to a dosing location thereneath, at 83". The pump 82" uses positive displacement to push the flow of slurry to the dosing location 83". This arrangement is successfully done when one is dosing to an application point 83" that is under pressure, and wherein the pressure is higher than the pressure in the loop 63, so that the pressure in the loop 63 can overcome the pressure at the application point 83". The particular metering pump 82" could be selected in size to overcome the pressure at location 83".

Figure 2A:
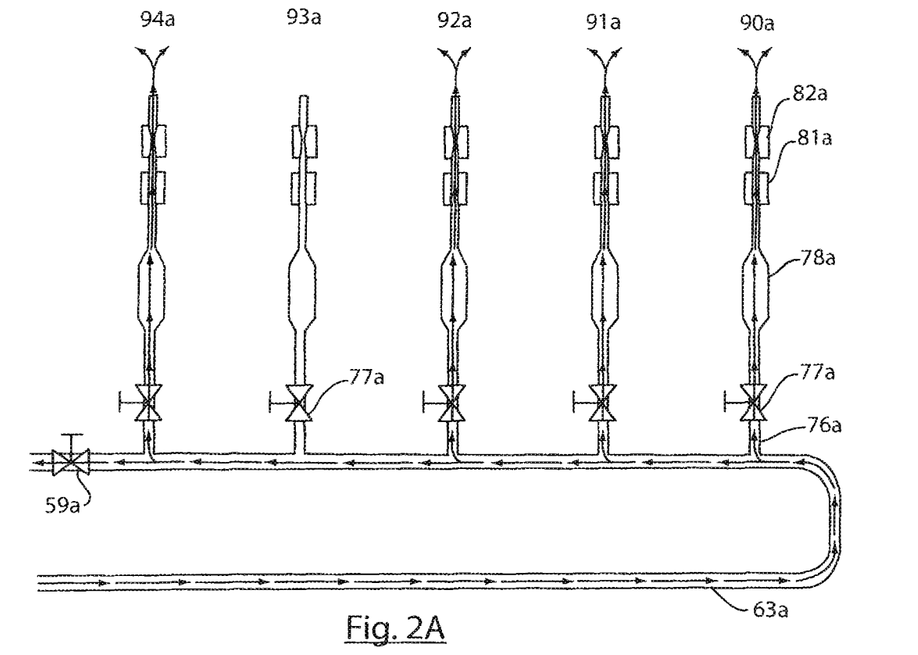
FIG. 2A is an illustration similar to that of FIG. 2, but wherein the dosing locations differ from those of FIG. 2, in that there is not a reverse bend in the line between the grit traps and flowmeters.

In FIG. 2A, the dosing locations 90a, 91a, 92a, 93a and 94a are shown extending in a generally straight lines commencing at 76a, through valves 77a, through grit traps 78a, through magnetic flowmeters 81a and pinch valve 82, to their respective locations, as an alternative arrangement to that illustrated in FIG. 2.

In FIGS. 2 and 2A, respective valve 59' and 59a can be applied to substantially close the dosing loops 63, 63a to atmosphere, by adjusting the valves 59' or 59a to maintain a relatively constant pressure, to create a back pressure from the aging tank 27 of FIG. 1, through delivery line 61, pump 62, delivery line 63, and to the dosing arrangement commencing at line 76 of FIG. 1, or to the dosing arrangements of FIGS. 2 and 2A. In FIG. 1, the valve 59 could, optionally, create a similar back pressure, as may be desired.

The separation device 64 may have one or more baffles in the form of laminar flow plates 72, 73, 74 and 75, one or more of which may be adjustable, as indicated for the baffle plate 72 between the full line and phantom line positions thereof, for facilitating separation of grit from the lime-treated water in the separation device 64.

The extraction of a portion of the lime-treated water from holding tank 28 can be performed more than once by returning the lime-treated water from the separation device 64 via line 67, back to the holding tank 28.

The separation device 64 may be provided with a movable wall and associated electric or pneumatic activation drives in accordance with U.S. Pat. No. 7,416,673, and the separation device 64 may be constructed in accordance with the separation devices of any of U.S. Pat. No. 7,416,673 and U.S. patent publication 2008/0185324 published Aug. 7, 2008 and/or published application 2006/0231507 published Oct. 19, 2006, the complete disclosures of which are all herein incorporated by reference. If a movable wall is provided for the separation device 64, such may enable one to vary the cross-sectional surface area of the device 64, which will cause an automatic variation in the volume of the liquid contained within the separation device 64. The return of the lime-treated water back to the holding tank 28 via line 67 enables further purification and grit removal.

As described above, the lime mixing vessel 15 can be mounted on one or more load cells or weighing cells for weighing the contents thereof; namely the lime and water. Load cells are electronic weighing devices that add a precise quantity of water to a known quantity of hydrated lime to optimize the lime mixture. The amount of lime and water to be added into the lime mixing vessel 15 can also be determined by volumetric or gravimetric means. The lime mixing vessel 15, as described above, has a motor equipped mixer 56, which can be controlled remotely and automatically.

After the lime/water mixing is completed, the lime slurry can be diluted to a predetermined concentration set point selected preferably within the range of about 5%-25%, or in the range of 10% to 20%, utilizing the direct weight measurement of lime and water via the load cells. The slurry concentration is within + or −0.5% of the set point (i.e. 9.5%-10.5% for a 10% slurry concentration setting).

The lime slurry holding tank 28 can be provided with an access cover at its upper end (not shown). The access cover can be gasketed to contain steam and dust. The bottom of the tank 28 can include a flange connection for the slurry pump 62 (not shown). Also, a separate drain opening can be provided for maintenance and cleaning of the lime slurry holding tank

28, also not shown. The motor 60, as with the motor 58 for the lime mixing vessel can include a speed reducer, which speed reducer can be grease lubricated and directly connected to the mixer shaft assembly.

The pump 62 for delivering lime-treated water from the holding tank 28 to the separation device 64 can be selected in size to provide a desired velocity through a conduit so that the grit particles and the lime particles do not settle within the conduit 63. The selected velocity of flow through all conduits of the invention also provides a scouring action from entrained grit particles, which helps keep the conduits from clogging due to build-up of scale within the conduits. The pump 62 can also contain seals that are self-sealing and require no water, as well as a high pressure switch. The separation device 64 allows for a small quantity of grit particles to remain in the lime-treated water to assist the scouring action and prevention of scale build-up.

The lime slurry holding tank 28 gradually and continuously delivers lime-treated water to the separation device 64 where grit is separated and removed by means of the slurry pump 62 and via the lime slurry loop 63.

The lime-treated water is then recycled into the aging tank 28 and run through the separation device 64 as many times as desired.

The system can also use fine grit classifier hydraulic separation to deliver a high-quality lime-treated water with minimal grit particles. Considering that the specific gravity of grit is approximately three times that of water, 2.65 versus 1.0, grit particles settle at a predetermined rate and adjusting the "rise rate" of the water allows for a precise separation to be made. For example, if grit settles at 3 feet per minute, then the rise rate of water can be set at 2 feet per minute. This hydraulic separation principle is used to keep the grit in the grit trap 78. Dosing of the high quality lime-treated water can also occur at multiple points along the loop 63.

With reference now to FIG. 2, there is provided a schematic illustration of the manner in which the lime/water loop 63 between the holding tank 28 and grit separator 64 can deliver dosing to any of a plurality of locations, even at different rates. It will be seen that the delivery loop 63 receives lime-treated water in the direction of the arrows, and delivers the same to any of a plurality of dosing locations in a multi-dosing location arrangement. Such dosing locations are indicated by the numerals 90, 91, 92, 93 and 94. It will be understood that any number of such dosing locations may exist on the loop 63.

As with the dosing described above with respect to FIG. 1, each of the dosing locations includes a line 76', a valve 77', a grit trap 78', an exit line 80', a magnetic flow meter 81' and a pinch valve 82'.

In the illustration of FIG. 2, the dosing apparatus for location 93 is out of service, because the valve 77' for that location 93 is in the closed position, in order to illustrate that not all dosing locations need to be operative at any given time. The other dosing locations may deliver precise dosing at varying rates. For example, one dosing location may be delivering 9.5 gallons per minute, for example, at dosing location 94, whereas dosing location 92 may be delivering 10.2 gallons per minute, with dosing location 91 delivering 9.7 gallons per minute, and dosing location 90 delivering 10.9 gallons per minute. It will be understood that substantial variation may be provided in the dosing rates, depending upon the desires of an operator.

It will be understood that with respect to the above description of FIGS. 1 and 2, there is provided a method and apparatus for creating a lime/water slurry for delivering high quality lime-treated water, preferably in batches, comprising automating the steps of the methods described above.

This invention also provides an automated system for automatically and continuously delivering a dosage of high-quality lime-treated water.

The above-described method can further comprise the step of dissolving scale buildup in the lime mixing vessel 15 and/or the lime slurry holding tank 28 by performing an acid wash after the lime/water mixing. An example of an acid wash system of this invention is illustrated in FIG. 3.

Referring to FIG. 3, this invention also provides a method for removing scale buildup in a lime/water mixing vessel 15, a lime slurry holding tank 28, or any delivery system comprising (a) monitoring scale build-up in the lime mixing vessel 15 via monitor 100, the lime slurry holding tank 28 via monitor 101, and/or the delivery system including the separation device 64 via the monitor 122; and (b) at a pre-determined set point of scale buildup or time, delivering an acid wash solution to the lime mixing vessel 15, the lime slurry holding tank 28 and/or the delivery system by use of an acid wash pump 102, thereby dissolving the scale build-up.

The acid is placed into the lime mixing vessel 15 through an inlet 103 thereof, either manually or automatically. If automatically, the computer 18, acting in response to one or more scale build-up monitors 100, 101 and 122, through control line 89, discharges acid from the acid supply 99 through supply line 109 to inlet 103. The acid enters the lime mixing vessel 15 above the liquid level 105 thereof. Water is delivered via line 23, as needed, into the lime mixing vessel 15, depending upon the operation of a valve 106, controlled either manually, or from the computer 18 via control line 107. As acid enters the lime mixing vessel 15, it is extracted after mixing with liquids therein, via line 108, upon opening of the valve 110 at the bottom thereof, which valve 110 can be controlled from the computer 18 via control line 111, and then the pump 102, activated via control line 112 from the computer 18, or manually, can deliver the acid/water solution back into the lime mixing vessel 15 via line 113, 115, lines 21 and/or 22 to the spray nozzles 114 that are disposed above the liquid level 105, in order to expose the entirety of the lime mixing vessel 15 to the acid wash. The acid rinse line 113 also delivers the acid rinse to the holding tank 28 via lines 115 and 116, to enter the holding tank 28 via one or more spray nozzles 117 therein, also located above the liquid level 118 thereof. Similarly, the acid wash is delivered to the separation device 64 by means of the pump 102, through line 113, line 115 and line 120, to enter the separation device 64 through one or a plurality of spray nozzles 121. Then, the generally continuous recirculation of the acid rinse from holding tank 28, via pump 62, delivery line 63, and back into the separation tank 64, then back into the holding tank 28 via line 67, continues the recirculation of the acid wash. The monitors 100 in any of the mixing vessel 15, 101 in the holding tank 28, and 122 in the separation device 64, can continually monitor the level of scale build-up in those vessels, and can communicate via signal lines 123, 124 and 125, respectively, to signal to the computer 18 when it is necessary to provide the acid rinse described above to the various equipment in the system. Then, the acid wash can be implemented manually or automatically.

When the monitoring step and delivering step are performed in the lime mixing vessel 15, this method can further comprise the step of discharging the acid wash solution from the lime mixing vessel 15 to the lime slurry holding tank 28 and any other part of the system.

The acid wash system of the invention can be applied to the lime mixing vessel 15, lime slurry holding tank 28, or any other part of the system. Spray nozzles can be positioned to be above the liquid level so that the nozzles delivering lime and water can be cleaned during the acid wash cycle. At least two spray nozzles can be installed in a vessel to maximize the coverage of the acid wash spray. The spray nozzles 114 can be eliminated, and water could be delivered directly into the lime mixing vessel 15 via lines 21, 22, in order to flood the lime mixing vessel 15 with the acid solution. The water entering the lime mixing vessel 15 in order to accomplish the acid wash can be under sufficient pressure to suit varied condition, and can be applied with variations in pressure, to provide a scouring system along with the solvent or acid, to aid in the cleaning of the entire system. In this regard, the entire system can include not only any of the lime mixing vessel, holding tank and grit separation device, but also the various piping, including the lines 30, 61, the pump 62, 63, and dosing sub-systems, including the extraction line 76, valve 77, grit trap 78, line 80, magnetic flowmeter 81 and pinch valve 82 of FIG. 1, and, alternatively, the line 63, extraction line 76, valve 77, grit trap 78, line 80, magnetic flowmeter 81 and metering pump 82" of FIG. 1A. After the acid wash cycle, either a batch of lime slurry or water can be used to flush the system to clean it. This acid wash system enables the system to run smoothly and provides adequate flow of the slurry in the system's conduits. If the acid wash cycle is to be automatically triggered, it can be set to start at certain times, or after a certain number of slaking cycles, or by measuring the build-up of scale by use of the load cells instead of any of the monitors 100, 101 and 122. In the case of using the load cells, the system utilizes a system wherein the weight of scale is calculated and when a critical mass is reached, the acid wash cycle is triggered.

The automatic acid washing system of this invention is thus able to use a solvent such as an acid where the lime mixing vessel, the slurry holding tank, and the remainder of the delivery system, including the grit separation device can be neutralized and whereby any scale build-up can be dissolved. The quantity of scale that is present in each batch being treated in the apparatus of this invention, being monitored by the monitors 100, 101 and 122 can be recorded in the computer 18, and when the level of scale build-up reaches a predetermined set point, or alternatively, on a periodic basis, a rinse cycle can be initiated whereby acid can be added to the lime mixing vessel 15, either manually through the access opening 103 thereof, or automatically from the above-described acid feed into the access opening 103, and whereby water is added to the lime mixing vessel 15 as described above, at a level above the liquid levels in the lime mixing vessel, the holding tank, and the separation device, in such a manner that the entire contents of all of the equipment are totally rinsed by feeding the acid/water through spray nozzles throughout the system, as described above. The rinse solution in the lime mixing vessel apparatus 15 can be discharged into the slurry holding tank 28 and the process can be repeated before the rinse solution is introduced into the delivery system. The delivery system can be cleaned by dosing a predetermined, variable and precise quantity of solvent solution into the potable water treatment process. The flow rate or rates of dosing, as addressed in the description above with respect to FIG. 2, can be the same, or variable, and such can be monitored and such information can be fed back to the computer control 18, or to a manual control, if desired. Thus, while it is known that lime produces scaling in the apparatus that handles the same, the scale can be removed to increase the reliability of the system, by measuring scale build-up and removing the same upon the scale build-up reaching a predetermined level, or periodically based upon a timed repeat scale-removal system. The system also sprays the acid/water solution throughout the equipment above the liquid level in the various lime mixing vessel 15, holding tank 28, and separation device 64, as described above, with the acid/water solution also being run through the loop 63, and dosed at any of various controlled rates into the water supply.

It will be understood that various modifications may be made to the system, including its method steps and apparatus, and its operation, all within the spirit and scope of the invention as defined in the appended claims.

What is claimed is:

1. A process of dissolving scale in a system for treating water with lime that is in the form of calcium hydroxide, that includes;
    (a) a lime mixing vessel in which lime and water are mixed to form a lime slurry;
    (b) a slurry holding tank for receiving lime slurry from the lime mixing vessel; and
    (c) a grit separation device for receiving lime slurry and separating grit particles therefrom;
    wherein each of the lime mixing vessel, slurry holding tank and grit separation device has a liquid level therein,
    wherein the process of dissolving scale dissolves scale on internal surfaces of each of the lime mixing vessel, slurry holding tank, and grit separation device,
    the process of dissolving scale comprising:
    adding an acid into the system;
    introducing water into at least one of the lime mixing vessel, slurry holding tank and grit separation device to provide an acid/water solution,
    wherein the acid/water solution is introduced into each of the lime mixing vessel, slurry holding tank and grit separation device, above their respective liquid levels,
    wherein the acid/water solution is introduced via spray nozzles in upper ends of each of the lime mixing vessel, slurry holding tank and grit separation device; and
    monitoring the level of scale buildup in at least one of the lime mixing vessel, the slurry holding and the grit separation device and initiating the scale dissolving process when scale buildup reaches a predetermined level, wherein the step of monitoring the scale buildup further comprises using one or more load cells to calculate the weight of scale and when a predetermined mass is reached, the scale dissolving process is triggered;
    the acid/water solution being pumped at varying pressures to scour the internal surfaces to remove lime scale.

2. The process of claim 1, including the step of controlling the scale dissolving process via a programmable logic computer in response to the monitoring step.

3. The process of claim 1, wherein the system further comprises piping and dosing sub-systems, and wherein the acid/water solution is introduced into said piping and dosing sub-systems to thereby dissolve scale therein.

4. In a system for treating water with lime that is in the form of calcium hydroxide, that includes:
    (a) a lime mixing vessel in which lime and water are mixed to form a lime slurry;
    (b) a slurry holding tank for receiving lime slurry from the lime mixing vessel; and
    (c) a grit separation device for receiving lime slurry and separating grit particles therefrom;
    wherein each of the lime mixing vessel, slurry holding tank and grit separation device has a liquid level therein, and wherein the system further comprises:
    means for adding an acid into the system;

means for introducing rinse water into at least one of the lime mixing vessel, slurry holding tank and grit separation device, wherein the water and the acid form an acid/water solution;

means for introducing the acid/water solution into each of the lime mixing vessel, slurry holding tank and grit separation device, above their respective liquid levels to thereby dissolve scale on internal surfaces of any of the lime mixing vessel, slurry holding tank, and grit separation device when an acid wash is triggered, and wherein the means for introducing an acid/water solution into each of the lime mixing vessel, slurry holding tank and grit separation device includes spray nozzles in upper ends of each of the lime mixing vessel, slurry holding tank and grit separation device and a pump, each of the lime mixing vessel, slurry holding tank and grit separation device being provided with one or more load cells;

means for controlling a scale dissolving process, said means for controlling a scale dissolving process monitoring the respective cells and triggering the acid wash when one or more of the load cells signal that a predetermined level has been reached; and means for pumping the acid/water solution at varying pressures effective to scour the internal surfaces to remove lime scale.

5. The system of claim 4, wherein said means for controlling a scale dissolving process comprises a programmable logic computer.

6. The system of claim 4, wherein the system further comprises piping and dosing sub-systems connected to said slurry holding tank such that said piping and dosing sub-systems can receive the acid/water solution from said slurry holding tank to thereby dissolve scale therein.

7. In a system for treating water with lime that is in the form of calcium hydroxide, that includes:
   (a) a lime mixing vessel in which lime and water are mixed to form a lime slurry;
   (b) a slurry holding tank for receiving lime slurry from the lime mixing vessel; and
   (c) a grit separation device for receiving lime slurry and separating grit particles therefrom;

wherein each of the lime mixing vessel, slurry holding tank and grit separation device has a liquid level therein, and wherein the system further comprises:

means for adding an acid into the system;

means for introducing water into at least one of the lime mixing vessel, slurry holding tank and grit separation device, wherein the water and the acid form an acid/water solution;

means for introducing the acid/water solution into each of the lime mixing vessel, slurry holding tank and grit separation device, above their respective liquid levels to thereby dissolve scale on internal surfaces of any of the lime mixing vessel, slurry holding tank, and grit separation device when an acid wash is triggered, and wherein the means for introducing an acid/water solution into each of the lime mixing vessel, slurry holding tank and grit separation device includes spray nozzles in upper ends of each of the lime mixing vessel, slurry holding tank and grit separation device and a pump, at least one of the lime mixing vessel, slurry holding tank and grit separation device being provided with one or more load cells;

means for controlling a scale dissolving process, said means for controlling a scale dissolving process monitoring the one or more load cells and triggering the acid wash when one or more load cells signal that a predetermined level has been reached; and means for pumping the acid/water solution at varying pressures effective to scour the internal surfaces to remove lime scale.

8. The system of claim 7, wherein said means for controlling a scale dissolving process comprises a programmable logic computer.

9. The system of claim 7, wherein the system further comprises piping and dosing sub-systems connected to said slurry holding tank such that said piping and dosing sub-systems can receive the acid/water solution from said slurry holding tank to thereby dissolve scale therein.

\* \* \* \* \*

UNITED STATES PATENT AND TRADEMARK OFFICE
CERTIFICATE OF CORRECTION

PATENT NO.         : 9,174,861 B2                                             Page 1 of 1
APPLICATION NO.    : 13/302312
DATED              : November 3, 2015
INVENTOR(S)        : Richard W. Christy, Michael Quici and Louis Litz

It is certified that error appears in the above-identified patent and that said Letters Patent is hereby corrected as shown below:

In the claims,

Column 9, Line 1, delete "rinse"

Column 9, Line 20, after "respective" insert -- load --

Signed and Sealed this
Sixteenth Day of February, 2016

Michelle K. Lee
*Director of the United States Patent and Trademark Office*